(12) United States Patent
Ytuarte et al.

(10) Patent No.: US 6,763,369 B1
(45) Date of Patent: Jul. 13, 2004

(54) HIERARCHICAL PROCESS MANAGEMENT IN AN INTELLIGENT CALL PROCESSING SYSTEM

(75) Inventors: Barry Ytuarte, Margate, FL (US); Jeff Swartz, Coral Springs, FL (US)

(73) Assignee: Interactive Intelligence, Inc., Indianapolis, IN (US)

( * ) Notice: Subject to any disclaimer, the term of this patent is extended or adjusted under 35 U.S.C. 154(b) by 693 days.

(21) Appl. No.: 09/615,561

(22) Filed: Jul. 13, 2000

Related U.S. Application Data

(60) Provisional application No. 60/186,487, filed on Mar. 2, 2000, and provisional application No. 60/143,460, filed on Jul. 13, 1999.

(51) Int. Cl.[7] .............................................. G06F 15/16
(52) U.S. Cl. ....................... 709/201; 455/418; 455/423; 455/9; 379/269
(58) Field of Search ................................ 709/201, 100, 709/242; 714/43, 4; 382/240

(56) References Cited

U.S. PATENT DOCUMENTS

| | | | |
|---|---|---|---|
| 5,255,305 A | 10/1993 | Sattar | |
| 5,481,707 A | 1/1996 | Murphy, Jr. et al. | |
| 5,513,341 A * | 4/1996 | Fujii et al. | 714/43 |
| 5,555,295 A | 9/1996 | Bhusri | |
| 5,805,785 A | 9/1998 | Dias et al. | |
| 5,915,012 A | 6/1999 | Miloslavsky | |
| 5,941,955 A * | 8/1999 | Wilby et al. | 709/242 |
| 5,966,087 A | 10/1999 | Koifman et al. | |
| 5,968,182 A | 10/1999 | Chen et al. | |
| 5,978,939 A | 11/1999 | Mizoguchi et al. | |
| 6,018,805 A | 1/2000 | Ma et al. | |
| 6,421,787 B1 * | 7/2002 | Slaughter et al. | 714/4 |
| 6,430,590 B1 * | 8/2002 | Fischer | 709/100 |
| 6,463,180 B1 * | 10/2002 | Krishnaswamy | 382/240 |

* cited by examiner

*Primary Examiner*—John Follansbee
*Assistant Examiner*—Philip Lee
(74) *Attorney, Agent, or Firm*—Woodard, Emhardt, Moriarty, McNett & Henry LLP

(57) ABSTRACT

A novel customer interaction center server, and a novel method of operating a customer interaction center server, are disclosed. In one embodiment, a network of nodes (each representing one or more subsystem processes) and dependency relationships (indicating which processes depend on what other processes) is used to start the server, and the processes are monitored. In some of these embodiments, a failure of a particular process in the set of target processes is detected and logged and/or handled by implementing a selective shutdown and restart of only a subset of the processes represented in the network, based on the dependency information therein.

19 Claims, 8 Drawing Sheets

HIERARCHICAL PROCESS MANAGEMENT IN AN INTELLIGENT CALL PROCESSING SYSTEM

REFERENCE TO RELATED APPLICATION

Benefit is claimed under 35 U.S.C. § 119(e) based on U.S. Provisional Application No. 60/143,460, filed Jul. 13, 1999, and on U.S. Provisional Application No. 60/186,487, filed Mar. 2, 2000.

BACKGROUND

The present invention relates to telephone call processing, and more particularly, but not exclusively, relates to the startup, monitoring, and shutdown of software processes to control and coordinate subsystems in a call processing server.

In a customer interaction center, an agent typically communicates with customers through in-bound calls, out-bound calls, or both. This communication is often by voice using a telephone handset or headset component of the agent's workstation. Usually, the workstation also includes a computer terminal or personal computer to interface with various application modules. These modules provide the agent with information directed to the particular customer service involved. In one common application, a customer's account information is provided on a display viewable by the agent.

In order to maximize customer interaction center efficiency and customer satisfaction with the service provided, computers have been used to control the flow and routing of communications into, through, and out of customer interaction centers. Such computer systems may include a plurality of hardware and software components that, for example, interface with the Public Switched Telephone Network (PSTN), in-house PBX systems, and a variety of computer networks.

Customer interaction center systems are typically very important to an organization's function and image in the minds of its customers. The efficiency and functionality provided by an interaction processing system is extremely important from a business perspective, and any down time for the system or parts thereof can be quite costly in revenue and goodwill.

There is, therefore, an ongoing need for improved reliability in interaction handling systems. There is a further need for methods, apparatus, and systems to reduce the impact of subsystem failures in interaction handling systems.

SUMMARY

One form of the present invention is a unique communication processing system. Other forms include unique interaction handling methods and apparatus. In further forms, a hierarchical data structure is used to manage subsystem processes more reliably in an interaction handling system.

Further forms, objects, features, aspects, benefits, advantages, and embodiments of the present invention shall become apparent from the detailed description and drawings provided herewith.

DETAILED DESCRIPTION OF SELECTED EMBODIMENTS

Figure 1:
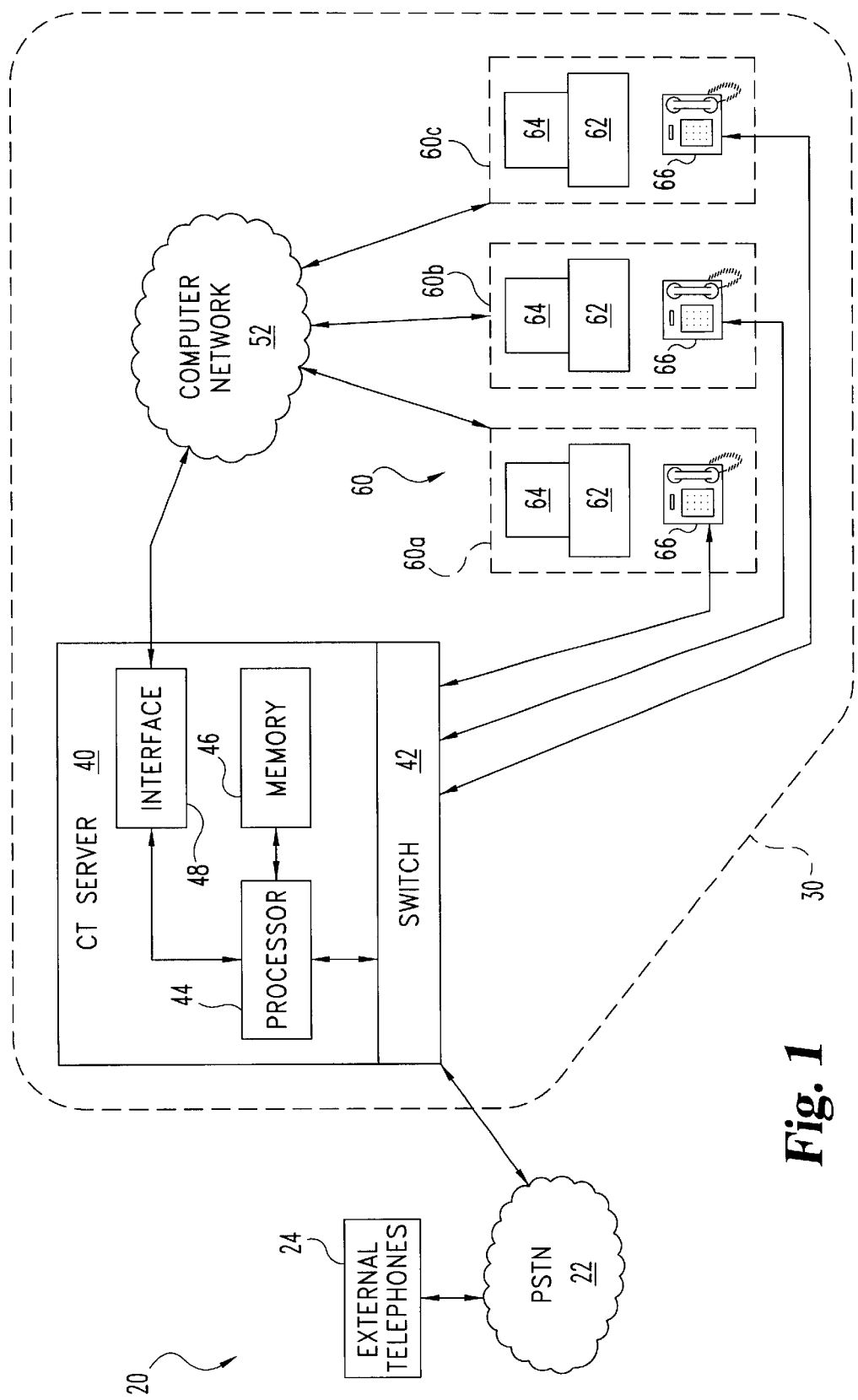
FIG. 1 is a schematic view of a system according to one embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 schematically illustrates customer interaction center system 20 of one embodiment of the present invention. System 20 includes Public Switched Telephone Network (PSTN) 22 operatively coupled to a number of external telephones 24 and customer interaction center 30. Customer interaction center 30 includes Computer Telephony (CT) server 40 with telecommunications switch 42 coupled to PSTN 22. Server 40 also includes processor 44, memory 46, and network interface 48. Network interface 48 is operatively coupled to computer network 52.

It should be understood that server 40 may include more than one processor or CPU and more than one type of memory; where memory 46 is representative of one or more types. Furthermore, it should be understood that while one server 40 is illustrated, more servers may be utilized in alternative embodiments. Processor 44 may be comprised of one or more components configured as a single unit. Alternatively, when of a multi-component form, processor 44 can have one or more components located remotely relative to the others. One or more components of processor 44 can be of the electronic variety defining digital circuitry, analog circuitry, or both. In one embodiment, processor 44 is of a conventional, integrated circuit microprocessor arrangement, such as one or more PENTIUM II or PENTIUM III processors supplied by INTEL Corporation of 2200 Mission College Boulevard, Santa Clara, Calif. 95052, USA. For this embodiment, switch 42 can be in the form of one or more telephone communication processing boards provided by DIALOGIC of 1515 Route Ten, Parsippany, N.J. 07054, USA.

Memory 46 can include one or more types each of solid-state electronic memory, magnetic memory, or optical memory, just to name a few. By way of non-limiting example, memory 46 can include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, memory 46 can be volatile, nonvolatile, or a hybrid combination of volatile and nonvolatile varieties.

Network 52 can be in the form of a Local Area Network (LAN), Wide Area Network (WAN) such as the Internet, or other type of network as would occur to those skilled in the art. Also coupled to network 52 are a number of agent workstations 60a, 60b, 60c (collectively designated agent stations 60). Agent workstations each include a workstation computer 62 coupled to a display 64. Although not shown here in order to preserve clarity, each workstation 60 can also include one or more operator input devices such as a keyboard, mouse, track ball, light pen, and/or microphone, to name just a few representative examples. Also, besides display 64, one or more other output devices can be included such as loudspeaker(s) and/or a printer.

Each workstation 60 further includes a telephone unit 66 as schematically illustrated in FIG. 1. Telephone units 66 may be in the form of a handset, headset, or other arrangement as would occur to those skilled in the art. Workstations 60 may be arranged identically to one another or may differ from one to the next as would occur to those skilled in the art. In one common arrangement, one workstation is designated for an agent supervisor that has different capabilities than those of other workstations. Furthermore, it should be understood that more or fewer workstations may be utilized than those illustrated.

System 20 can be arranged to provide for the coordination, conversion, and distribution of a number of different forms of communication, such as telephone calls, voice mail, faxes, e-mail, web chats, web call-backs, and the like. Furthermore, business/customer data associated with various communications may be stored in memory 46 and selectively accessed by one or more workstations 60. This data may be presented with a corresponding display 64.

Figure 2:
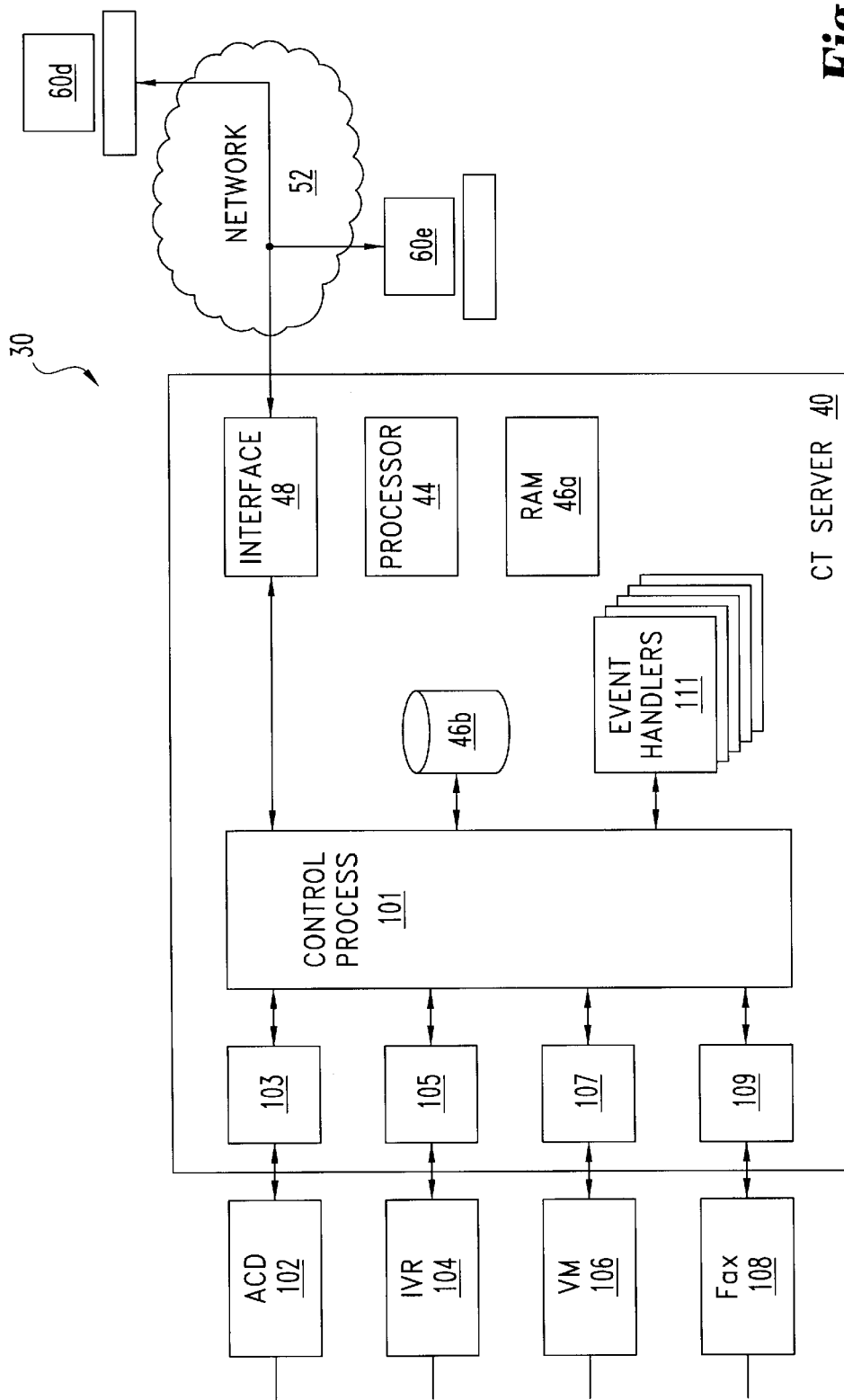
FIG. 2 is a schematic view of an interaction server and remote control sites.

Referring additionally to FIG. 2, further details of center 30 and CT server 40 are illustrated. In this embodiment, CT server 40 is operatively connected to hardware components ACD (automatic communication distributor) 102, interactive voice response unit 104, voice mail system 106, and facsimile server hardware 108. Control process 101 executes on CT server 40 to coordinate the subsystems of the server 40 as described in further detail below. Physical subsystem hardware components 102, 104, 106, and 108 are driven by driver processes 103, 105, 107, and 109, respectively, which are executed by processor 44. These driver processes 103, 105, 107, and 109 translate commands issued by control process 101 using a device application programming interface (API) to control those devices at the device level.

In some embodiments of the present invention, control process 101 spawns event handlers 111 to determine and execute the proper handling of each interaction event or group of events processed by CT server 40. Control process 101, device drivers 103, 105, 107, and 109, and event handlers 111 each access RAM 46a and mass storage device 46b to obtain and store program instructions and data to be executed and used by processor 44. Network interface 48 enables interaction between control process 101 and resources accessible via network 52, and allows other entities attached to network 52 access to resources on server 40. For example, workstations 60d and 60e access certain functions of CT server 40 via network 52 as discussed below.

Figure 3:
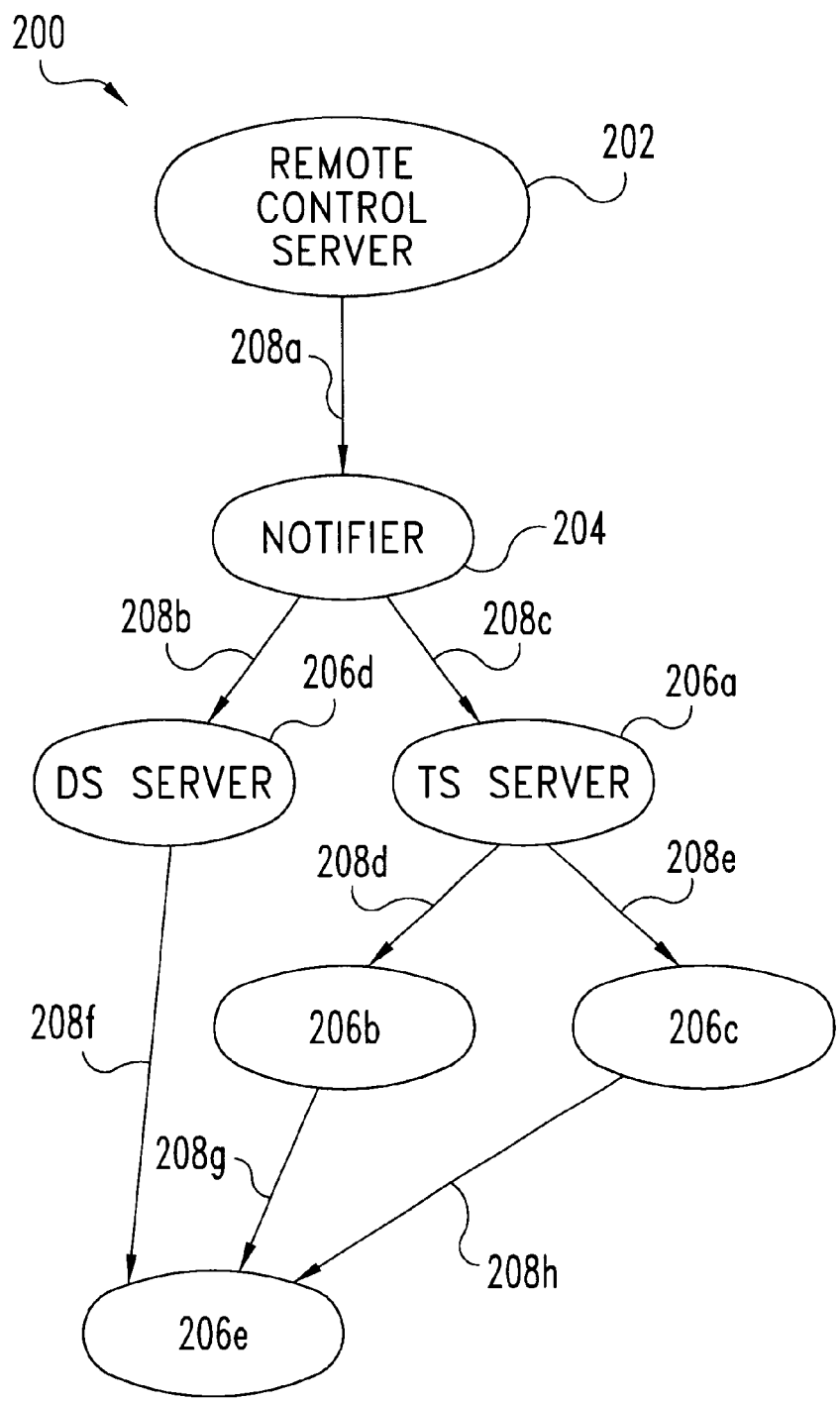
FIG. 3 is a chart of a dependency relationship network.

In the exemplary embodiment shown in FIG. 3, network 200 is a tree data structure that is used to organize information related to the subsystem processes in CT server 40. Network 200 is a collection of nodes 202, 204, 206a, 206b, 206c, 206d, and 206e that each contain a reference to start-up information for a telephony subsystem process (such as a startup executable file or routine), and relationships 208a, 208b, 208c, 208d, 208e, 208f, 208g, and 208h (generically referenced as 208x). In some embodiments, each node contains additional data regarding the process, including as non-limiting examples authorization requirements, allowable shutdown time, configuration information, and permission information related to remote accessibility. In some embodiments, a given node may depend on a plurality of other nodes. And in some embodiments, a given node may be depended upon by a plurality of other nodes.

Remote control server node 202 is the root node in the network 200. Data in node 202 identifies program instructions for a remote control (remote management) process, which manages the subsystem processes that run on CT server 40, and remote access thereto and control thereof. Data in notifier node 204 contains a reference to programming instructions executable to establish a message-passing (notifier) process on CT server 40. In this exemplary embodiment, the process executed according to notifier node 204 manages an event-driven interaction management system on CT server 40.

Other nodes 206a, 206b, . . . 206e contain data related to other subsystem processes that are available to be executed on CT server 40. Some nodes relate to device driver processes 103, 105, 107, 109 that other subsystem processes (such as telephony application processes) use to make them fully functional. Relationships 2 08a, 208b, . . . 208h indicate the dependencies among the processes to which the nodes 202, 204, . . . 206e refer.

For example, the process referred to by notifier node 204 relies on the functionality of the process to which remote control server node 202 refers. This dependency is represented in FIG. 3 by the directional arrow 208a between node 202 and node 204. Each arrow 208a, 208b, etc. in FIG. 3 represents a different relationship between corresponding nodes, wherein the process referred to by the node at the arrow head depends upon the process referred to by the node at the arrow tail.

The process depicted in the flowchart of FIG. 4 will now be discussed with continuing reference to the components of CT server 40 presented in FIG. 2, and to the network 200 presented in FIG. 3. When CT server 40 is started, the subsystem processes are started in an organized fashion according to one embodiment of the present invention. First, at block 310, control process 101 is started. In one embodiment, control process 101 supervises the remainder of the startup and execution steps below. At block 320, control process 101 set its focus upon the root node of network 200. This focus may be in the form of one or more iterators, pointers, or other constructs known to those skilled in the art, and the node with the current focus is alternatively referred to herein as the "current node."

At block 330 the process to which the current node refers is started. If that process is not successfully started, as determined next at decision block 340, then the system is halted at block 350. In some embodiments block 330 may also include second and subsequent attempts to start the process to which the current node refers, perhaps with alternative parameters in case the first attempt fails. In some alternative embodiments, a node can refer to secondary, backup, or alternative resources that may be used in place of the process initially specified by the current node. In other alternative embodiments, the action taken when a process fails to start depends on the operating mode in which the system is started. In still other alternative embodiments, the action taken when a process fails to start includes for example a preset, programmable, or dynamic number of restart attempts; creation of a log entry in a file and/or database; or no action at all.

If, however, the process is successfully started (as determined at decision block 340), then it is decided at decision block 360 whether the current node is depended upon by one or more other nodes. If so, then the focus is moved at block 370 to one of the nodes that depends on the current node, and the method returns to the entry point of block 323.

If the node with the current focus does not have a child node (i.e., no other node depends on the current node) as determined at decision block 360, then a decision is made at decision block 380 whether the current node is the root node of network 200. If it is not, then the focus is returned at block 390 to the parent of the current node (that is, the node that held the focus immediately before the current node, and which the current node depends on), and the method returns to the entry point of decision block 360 for a determination of whether that parent node has another unprocessed child node.

If, however, it is determined at decision block 380 that the current node is the root node of network 200, then network 200 has been traversed, and each process represented by a node therein that was intended to be started has been successfully started. The method, therefore, ends at end block 399.

The shutdown of subsystems in this exemplary embodiment may be managed as will now be described in relation to FIG. 5, with continuing reference to FIG. 3. It may be desirable to shut these processes down, for example, for a regular maintenance procedure such as data reporting, storage integrity checking, or backup.

This exemplary shutdown procedure 400 begins at start block 401 and moves to block 410, where the focus is placed on the root node of network 200. The method then enters its main loop at decision block 420, where it is determined whether the process to which the current node refers is depended upon by another still-running process (to which a "child node" refers). If so, the focus is moved to that dependent node at block 430, and the method restarts the loop at the entry point to decision block 420.

If it is determined at decision block 420 that the node with the current focus has no unprocessed child nodes, the method moves to block 440, where the process referred to by the current node is sent a "terminate" signal. The method waits at block 450 for up to a predetermined amount of time and monitors the termination. In some embodiments, this waiting time is the same for each node, and in some embodiments the waiting time is specified by a value stored in the node.

At decision block 460 it is determined whether the termination was successful. If so, the method moves on to decision block 480. If not, termination of the process referred to by the current node is forced at block 470 before the method continues at decision block 480.

When the method reaches decision block 480, it is determined whether the node with the current focus is the root node of network 200. If not, the focus is moved at block 490 from the current node to the "parent" of the current node (i.e., the node that refers to a process on which the current node's process depends, and that had the focus just before the current node obtained the focus), after which the method returns to the entry point of decision block 420. If it is determined at decision block 480 that the root node of network 200 does currently have the focus, then the shutdown is halted at end block 499.

Figure 4:
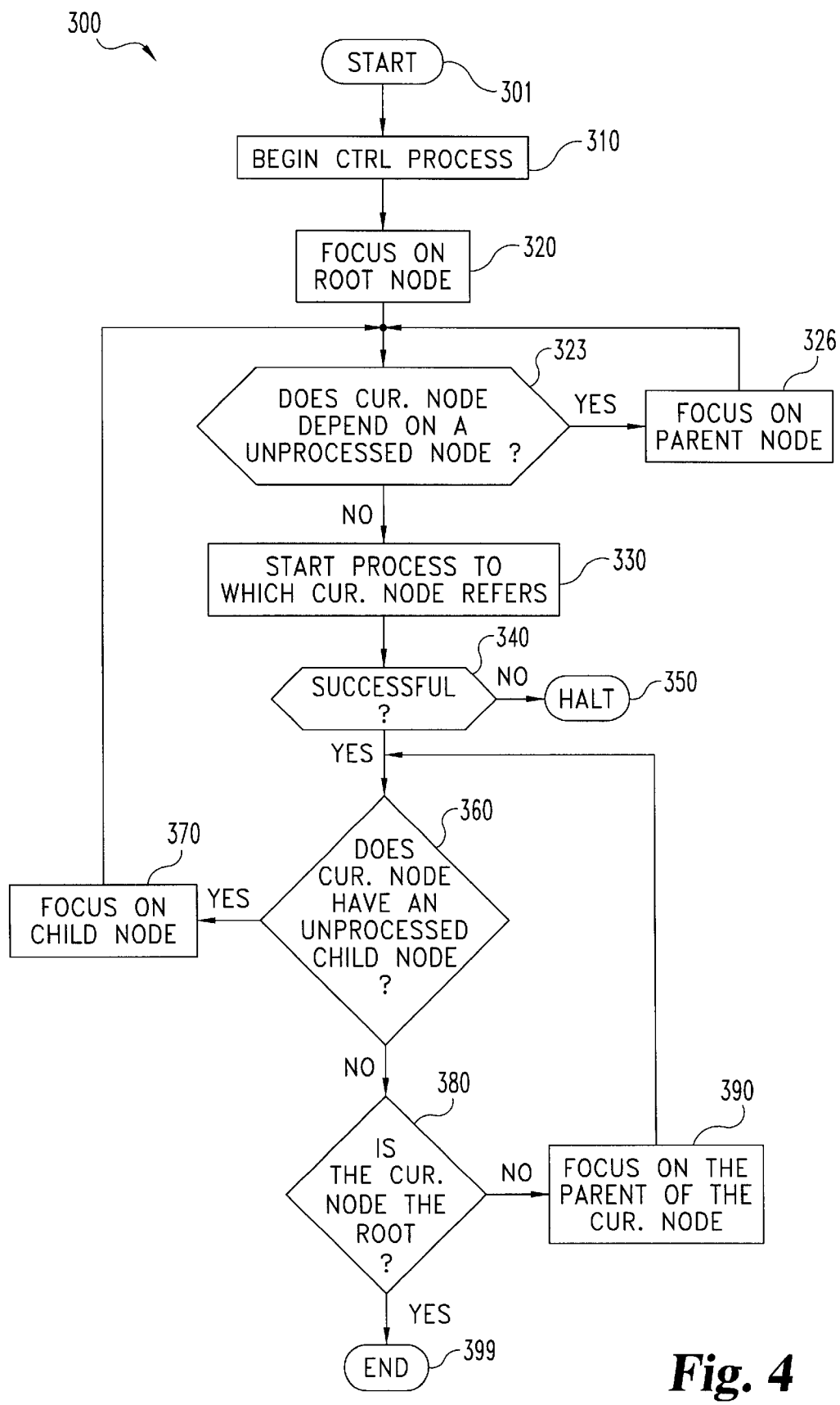
FIG. 4 is a flow chart of the start-up of selected interaction server processes.
Figure 5:
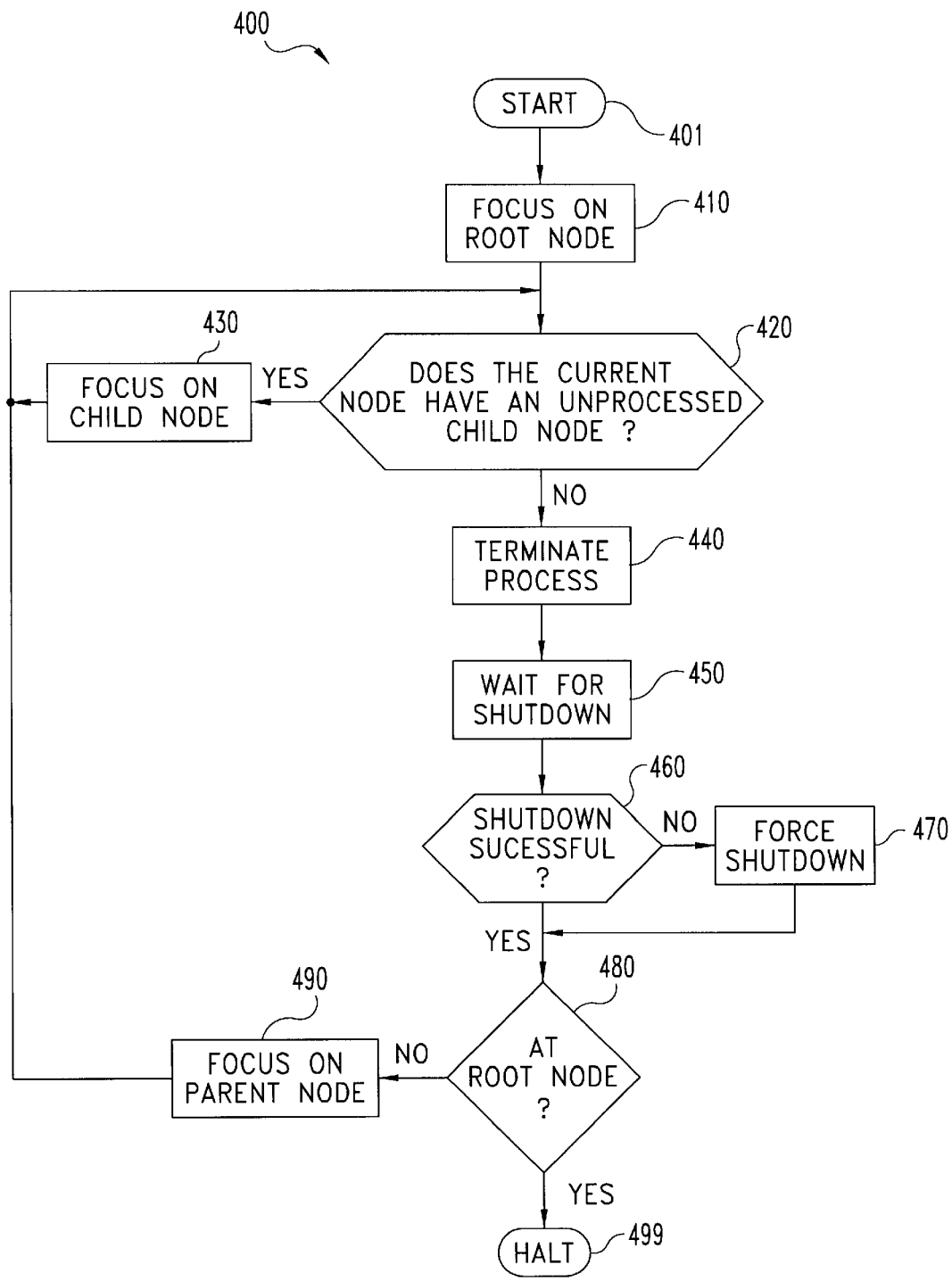
FIG. 5 is a flow chart of the shutdown of selected interaction server processes.

It will be apparent to those skilled in the art that the methods described in FIGS. 4 and 5 represent a prefix and postfix traversal, respectively, of network 200. The methods disclosed herein may be modified without undue experimentation to use other traversal strategies (such as a postfix startup and prefix shutdown strategy, or a depth-ordered strategy, or any of many known multi-threading strategies) as may be desired or necessary in a particular system. Any of these strategies can alternatively be implemented recursively. In other embodiments, only a portion of network 200 is traversed at start-up, with the remaining processes (and their dependencies) being started, stopped, and/or restarted as needed.

In some embodiments of the present invention, control process 101 (see FIG. 2) performs the startup method shown in FIG. 4 and monitors each process that it starts. It performs this monitoring, for example, by maintaining a "heartbeat monitor" that monitors the status of each of those processes. The heartbeat monitor can take the form of, for example, a periodic sending or exchange of messages by or between the processes, monitoring the total CPU usage by the process, monitoring the CPU usage by the process over a period of time, monitoring the memory usage by the process, and/or monitoring the thread count for the process. Values outside an expected or acceptable range may trigger corrective action by the control process 101.

Figure 6A:
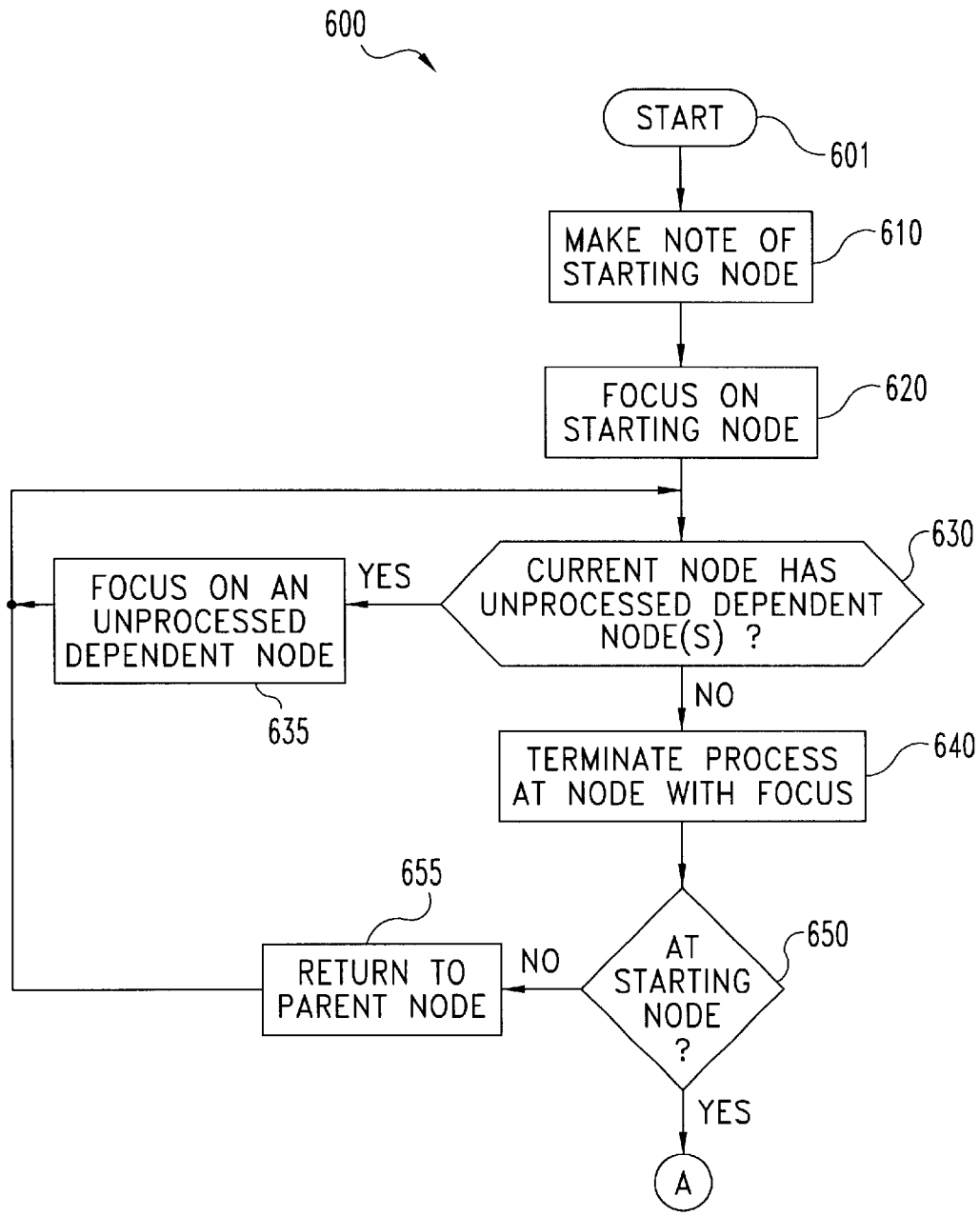
FIGS. 6A and 6B together are a flow chart of the selective restart of some interaction server processes.
Figure 6B:
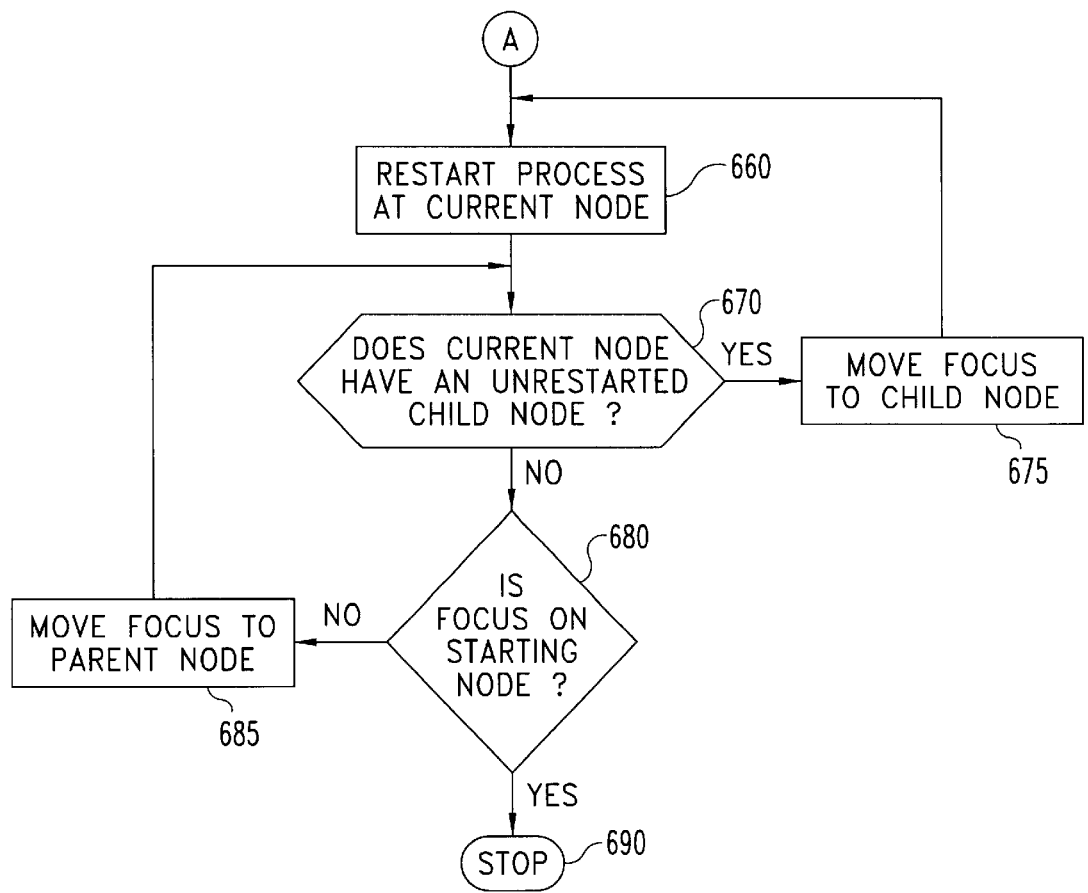

This corrective action may, for example, take the form of the "partial shutdown and restart" method illustrated in FIGS. 6A and 6B and described presently. This exemplary partial shutdown and restart procedure 600 begins at starting point 601. The system makes note of the starting node at block 610. This starting node may be determined as a parameter to a function call, the detection of a failed process (for example, as discussed in the preceding paragraph), or other method by which one skilled in the art would determine that part of the system should be or must be restarted. At block 620, the focus is placed on that starting node. Again this focus may be in the form of one or more iterators, pointers, or other place-holding techniques known to those skilled in the art.

A check is performed at decision block 630 for unprocessed nodes that depend on the current node. If such dependent nodes are found to exist, the system moves the focus to one of the dependent nodes at block 635, then returns to the entry point of decision block 630. If no such dependent nodes are found at decision block 630, then the process represented by the current node is terminated at block 640. The termination at block 640 may take the form of the staged process termination described above in relation to blocks 440, 450, and 460 of FIG. 5 or other form known to those skilled in the art.

After the process to which the current node refers has been terminated at block 640, the system checks at block 650 whether the current node is the starting node that was noted at block 610. If not, focus is returned to the parent node (upon which the current node depends, and from which the focus had been transferred to the current node) at block 655, then the method returns to the entry point for decision block 630, described above. If, however, it is determined at decision block 650 that the node with the focus is the starting node noted at block 610, the method proceeds through marker block A to block 660, shown in FIG. 6B.

At block 660, the process represented by the current node is restarted. The current node is then checked at decision block 670 for any nodes that depend on it, but have not yet been restarted. If one or more such subordinate nodes are found to exist, the focus is moved at block 675 to one of them, then the method returns to the entry point for block 660.

If no such un-restarted subordinate node is found at decision block 670, the method moves to decision block 680, where it is determined whether the node with the current focus is again the starting node that was noted at block 610 (discussed above in relation to FIG. 6A). If the node with the current focus is determined at block 680 to be other than the starting node from block 610, the method moves to block 685, where the focus is returned to the node upon which the present node depends. The method then returns to the entry point of decision block 670, described above.

If at decision block 680 it is found that the node with the current focus is the starting node noted at block 610, the process ends at block 690. It can be seen that the above method shown in FIGS. 6A–6B is effective to restart a given subsystem process (associated with the "starting node") and every running subsystem process that depends on it, directly or indirectly, without a shutdown and restart of processes not in that branch of the dependency tree. That is, in some embodiments of the present invention, an interaction server is provided with self-diagnostic capabilities, so that when a subsystem process becomes inoperative, a control process is able to detect and correct the condition without resort to a full restart of the system.

In some forms of these embodiments, different responses are made to the failure of different systems. For example, the detected failure of a critical system process (such as that represented by node 204 in FIG. 3) may trigger the partial restart procedure described herein, while the detected failure of a rarely-used process might simply be logged to a file or database, or it might be ignored. Failure of another process may trigger still another error-handling subroutine or Simple Network Management Protocol (SNMP) trap, according to the needs, preferences, and/or desires of the system owner or administrator.

In an alternative embodiment, described now with reference again to FIG. 2, process monitoring and management services are made available via network(s) 52 for remote administration. In one such embodiment, a graphical user interface (GUI) is provided in the form of a Remote Control Console application running on computer 60e. In a system with multiple CT servers 40 and/or other telephony or telecommunications hardware, such an application may provide centralized monitoring and management of the telephony/telecommunications system, thereby simplifying both access to and use of information regarding the health and resource status of one or more server processes. By allowing system administrators to quickly access system health data, then restart selected sections of the process network, some embodiments of the present invention will dramatically reduce the business impact of subsystem failures and lock-ups.

In another embodiment, one or more of the subsystem monitoring and management functions discussed herein are made available throughout the system using a standardized network management protocol such as SNMP. In such embodiments, these functions may be used by custom management applications, generic network management applications, and even interaction event handling routines 111 within the same instance or a different instance of the interaction management system 20. These applications and routines may be running locally on CT server 40 or remotely on hardware connected via network 52.

In another embodiment, a failed subsystem may or may not be restarted.

In yet another embodiment, "nice shutdown" steps 430, 440, and 450 (see FIG. 5) are omitted for a predetermined set of subsystems in favor of immediate, forced shutdown (as at block 460). In still another embodiment, a flag indicating whether nice shutdown steps at blocks 430, 440, and 450 are to be taken or omitted (and if taken, the length of time to wait for proper termination at block 440) are stored in one or more nodes of network 200.

In other embodiments, network data structure 200 of data nodes is stored in a configuration registry. This may, for example, be the system registry of a Microsoft WINDOWS® operating system.

In yet another embodiment, heartbeat monitoring of subsystem processes includes monitoring the total elapsed CPU time used by the process and/or the percentage of CPU time over an interval of time used by the process.

Figure 7:
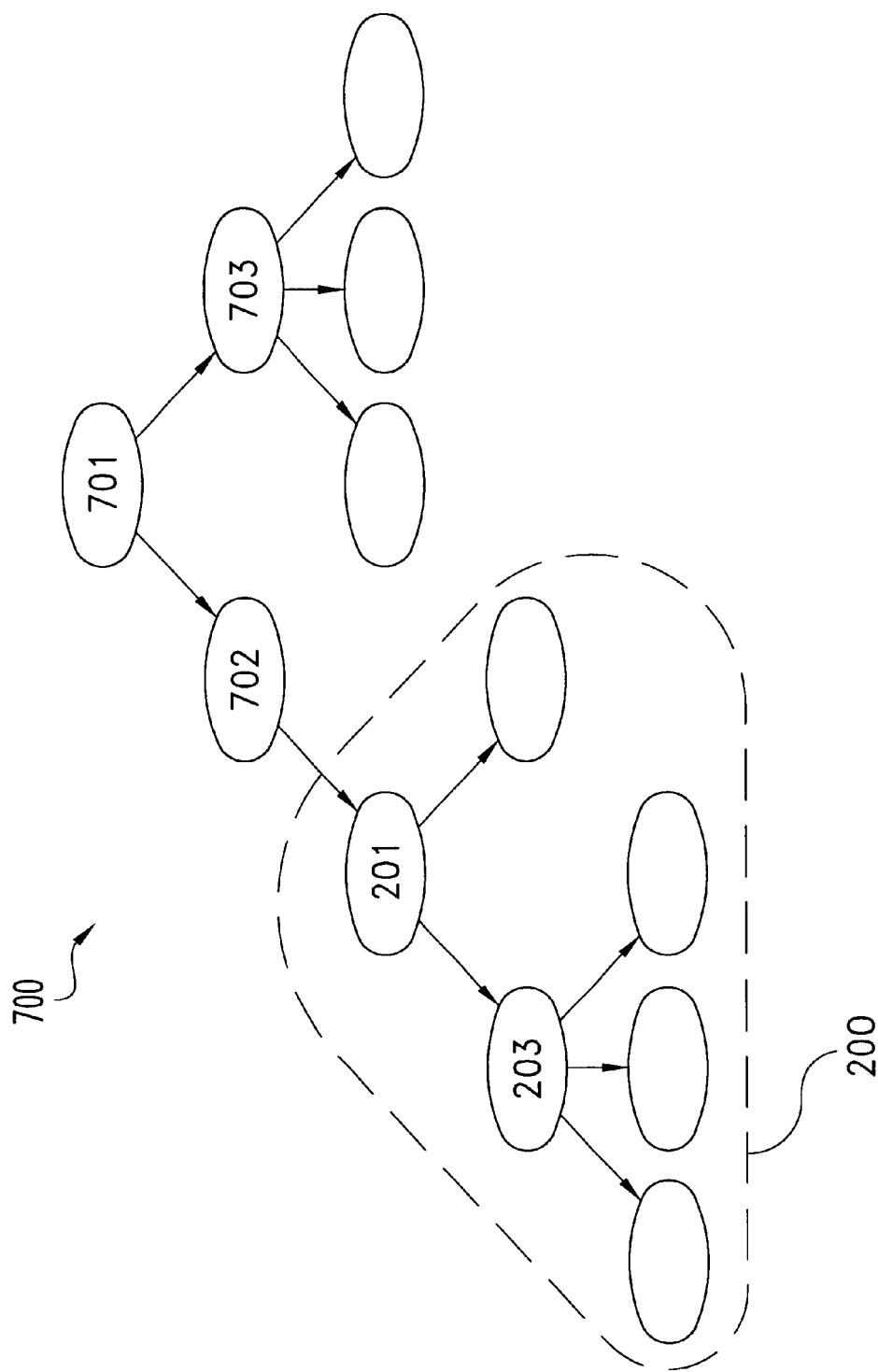
FIG. 7 is a chart of a dependency relationship network according to an alternative embodiment of the present invention.

In some embodiments network 200, in addition to the process-related nodes discussed above in relation to FIG. 3, includes nodes and groups of nodes and relationships that represent other data and relationships related to system processes and/or subsystems. For example, one such additional node may be linked to Remote Control Server node 202 and include data related to other CT servers 40 in a system, including for example network addresses, instance identifiers, physical location information, administrator contact information, etc. Additional configuration information related to a particular subsystem may be stored with the node referencing that subsystem. In other embodiments, the root node 201 of network 200 has a parent node 702 within a larger network 700, as shown in FIG. 7. As with network 200, all or part of network 700 may be stored in a common configuration registry, such as the WINDOWS system registry. Node 701 and/or other nodes in network 700 that lie outside network 200 may, in some embodiments, contain system data or configuration data for other applications. "System data" as used herein is data related to non-telephony subsystems and processes.

In some embodiments of the present invention, an intelligent call-processing server is operated by establishing a network data structure with a plurality of nodes and a plurality of dependency relationships among the nodes. Each node includes startup information relating to a different one of a number of communication subsystems in the customer interaction center. Each relationship links a superior node to a subordinate node, where the subsystem referred to by the subordinate node requires the subsystem referred to by the superior node. Each of the nodes is processed by starting the telephony subsystem to which the nodes' startup information relates. The nodes are processed in an order such that for each dependency relationship in the network, the subsystem to which the superior node's startup information relates is started before the subsystem to which the subordinate node's startup information relates. A heartbeat monitor is maintained and monitors a set of target processes including at least one of the telephony subsystem processes.

In another embodiment, an intelligent call-processing server is operated by establishing a dependency tree comprising references to a first communication management subsystem process, a group of two or more second communication management subsystem processes, (each process in the group being dependent on one or more of the other processes selected from the first process and the second processes), and a communication management system process dependent on the first subsystem process and the group of second subsystem processes; starting a control process, the first subsystem process, each process in the group of second subsystem processes, and the communication management system process, so that each particular process is started after the process(es) on which it depends have been started. In some of these embodiments, a heartbeat monitor is maintained. The heartbeat monitor monitors a set of target processes, for example, by monitoring total CPU usage, CPU usage over a period of time, amount of memory, and/or the number of threads used by one or more of the target processes.

In others of these embodiments, the system may detect a failure of a particular process (from the set of target processes) that has one or more subordinate processes depending on it. The remainder of the processes to which references appear in the tree data structure are not shut down, while the system stops the subsystem processes that depend on that particular process, stops and restarts the particular process, and restarts the subsystem processes that depend on the particular process.

Yet another embodiment includes a tree data structure corresponding to a root node (representing a communications server control process) and a plurality of subordinate nodes, each representing a different one of a number of communication subsystem processes and referring to one or more superior nodes, which are either the root node or another one of the subordinate nodes, such that the communication subsystem processes are each dependent upon one or more of the processes represented by its superior node(s). This alternative embodiment also includes a controller and a computer-readable medium encoded with instructions executable by the controller to start the processes in accordance with the tree, and to monitor the processes as they run.

In some of these alternative embodiments, the instructions are further executable by the controller to shut down the communication subsystem processes represented by the plurality of subordinate nodes, and when the communication subsystem processes have been shut down, ending the communication server control process.

All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected.

What is claimed is:

1. A method of operating a customer interaction center server, comprising:
    establishing a network data structure, comprising:
        a plurality of nodes, each comprising startup information relating to a different one of a number of communication subsystems; and
        a plurality of relationships, each between at least two of the plurality of nodes, and each comprising:
            a reference to a superior node selected from the plurality of nodes;
            a reference to a subordinate node selected from the plurality of nodes, wherein the subsystem to which the subordinate node's startup information relates depends on the subsystem to which the superior node's startup information relates;
    processing each of the plurality of nodes by starting the subsystem to which the node's startup information relates; and
    maintaining a heartbeat monitor that monitors a set of target processes comprising at least one of the number of telephony subsystem processes;
    where said processing is done so that, for each relationship in the plurality of relationships, the subsystem to which the superior node's startup information relates is started before the subsystem to which the subordinate node's startup information relates.

2. The method of claim 1, wherein said establishing comprises storing the network data structure in a configuration registry.

3. The method of claim 1, wherein said establishing comprises:
    storing the network data structure in program logic.

4. The method of claim 1, wherein
    each target process in the said of target processes has a CPU usage; and
    said maintaining comprises monitoring the CPU usage by at least one process from said set of target processes.

5. The method of claim 1, wherein said maintaining comprises monitoring an amount of memory used by at least one process from said set of target processes.

6. The method of claim 1, wherein said maintaining comprises monitoring a thread count for at least one process from said set of target processes.

7. A method of operating an intelligent call processing server, comprising:
    establishing a dependency tree, comprising references to:
        a first telephony subsystem process;
        a plurality of second telephony subsystem processes, each dependent on one or more processes selected from a process group consisting of the first telephony subsystem process and the plurality of second telephony subsystem processes; and
        a telephony subsystem process dependent on the first telephony subsystem process and the plurality of second telephony subsystem processes;
    starting a control process;
    starting the first telephony subsystem process;
    after said starting the control process and said starting the first telephony subsystem process, starting the plurality of second telephony subsystem processes such that each second telephony subsystem process is started after the one or more processes on which the particular second telephony subsystem process depends are started;
    starting the telephony system process; and
    maintaining a heartbeat monitor that monitors a set of target telephony processes comprising at least one of the plurality of second telephony subsystem processes.

8. The method according to claim 7, wherein said establishing comprises:
    storing the dependency tree in a configuration registry.

9. The method according to claim 7, wherein said establishing comprises:
    storing the dependency tree in program logic.

10. The method according to claim 7, wherein
each target process in the set of target processes has a CPU usage; and
said maintaining comprises monitoring the CPU usage by at least one process from said set of target telephony processes.

11. The method according to claim 7, wherein said maintaining comprises monitoring an amount of memory used by at least one process from said set of target processes.

12. The method according to claim 7, wherein said maintaining comprises monitoring a thread count for at least one process from said set of target processes.

13. The method according to claim 7, further comprising:
detecting a failure of a failed process in the set of target telephony processes; and
maintaining in a running state the remainder of the processes in the set of target telephony processes while:
stopping the telephony subsystem processes that depend on the failed process according to the dependency tree;
restarting the failed process; and then
restarting the telephony subsystem processes that, according to the dependency tree, depend on the failed process.

14. An apparatus, comprising:
a first memory storing a tree data structure corresponding to:
a root node representing a telephony server control process; and
a plurality of subordinate nodes, each representing a different one of a number of telephony subsystem processes process or process groups and referring to one or more superior nodes, wherein each said superior node is either said root node or another of said plurality of subordinate nodes, and wherein said telephony subsystem processes are each dependent upon one or more of the processes or process groups represented by said one or more superior nodes;
a controller in communication with said first memory; and
a computer-readable medium encoded with instructions executable by said controller to:
start said processes in accordance with said tree data structure; and
detect a failure of at least one of said processes.

15. The apparatus of claim 14, wherein said first memory is a system registry.

16. The apparatus of claim 14, said tree data structure further comprising a non-process node that represents system data.

17. The apparatus of claim 16, wherein said non-process node is a superior node to said root node in said tree data structure.

18. The apparatus of claim 16, wherein said non-process node is a subordinate node to said root node in said tree data structure.

19. The apparatus of claim 14 wherein said instructions are further executable by said controller to:
shut down said telephony subsystem processes represented by said plurality of subordinate nodes; and
when said telephony subsystem processes have been shut down, ending said telephony server control process.

* * * * *